United States Patent [19]

Furukawa

[11] Patent Number: 4,496,934
[45] Date of Patent: Jan. 29, 1985

[54] ENCODING AND DECODING SYSTEMS FOR BINARY DATA

[75] Inventor: Teruo Furukawa, Amagasaki, Japan

[73] Assignee: Mitsubishi Denki Kabushiki Kaisha, Tokyo, Japan

[21] Appl. No.: 355,559

[22] PCT Filed: Sep. 4, 1981

[86] PCT No.: PCT/JP81/00218
§ 371 Date: Feb. 11, 1982
§ 102(e) Date: Feb. 11, 1982

[87] PCT Pub. No.: WO82/00905
PCT Pub. Date: Mar. 18, 1982

[30] Foreign Application Priority Data

Sep. 5, 1980 [JP] Japan .................. 55-124459
Sep. 5, 1980 [JP] Japan .................. 55-124460

[51] Int. Cl.³ .................................. H03K 13/24
[52] U.S. Cl. ..................... 340/347 DD; 360/40
[58] Field of Search ............ 340/347 DD; 360/40, 360/44, 45, 51

[56] References Cited

U.S. PATENT DOCUMENTS 3,852,687 12/1974 Hodges .................. 340/347 DD
4,323,931 4/1982 Jacoby ....................... 360/40
4,337,458 6/1982 Cohn ...................... 340/347 DD

OTHER PUBLICATIONS

Miessler, "IBM Technical Disclosure Bulletin", vol. 17, No. 5, Oct. 1974, pp. 1489–1491.
Horiguchi, "IEEE Transactions on Magnetics", vol. MAG-12, No. 6, Nov. 1976, pp. 740–742.
Franaszek, "IBM Journal of Research and Development", Jul. 1970, pp. 376–383.

Primary Examiner—Charles D. Miller
Attorney, Agent, or Firm—Wenderoth, Lind & Ponack

[57] ABSTRACT

An encoding system for converting binary data to code sequences suitable for recording or reproducing where each 2-bit data word in a binary data sequence is converted into 4-bit codes so as thereby cause from not less than two and not greater than eight code bits of "0" value to exist between any code bit of value "1" and a next succeeding code bit of value "1" in this converted code sequence.

7 Claims, 6 Drawing Figures

ENCODING AND DECODING SYSTEMS FOR BINARY DATA

BACKGROUND OF THE INVENTION

This invention relates to a binary data encoding system for converting a sequence of binary data to a sequence of binary codes suitable for the recording original binary data on a record medium such as a magnetic tape or a magnetic disc, and a decoding system for decoding and converting the sequence of converted binary codes upon reproducing it from the record medium.

In order to increase a recording density upon recording binary data on a record medium such as a magnetic tape or a magnetic disc there are previously proposed and practiced various encoding systems.

FIGS. 1(a)–(e) are explanatory diagrams of one example of a conventional encoding system. FIG. 1(a) shows one example of a bit pattern of an original binary data sequence wherein numerals 0 and 1 express logic "0" and "1" respectively and $T_o$ indicates a bit interval. FIGS. (b) and (d) are one example of conventional encoding systems; FIG. (b) is called an MFM system (modified FM system) and FIG. (d) is called a 3 PM system (3 position modulation system. As examples of sorts of appliances applied to the respective systems, the MFM system is used with magnetic disc devices (3330, 3340, 3350 etc.) of IBM and the 3 PM system is used with a magnetic disc device (8434) of Uniback. A conversion algorithm of the MFM system is to convert bits "1" and "0" of an original binary data sequence to "01" and "X0" respectively where "X" becomes a complementary logic (1→0 or 0→1) of a code bit just preceding thereto. Also, a conversion algorithm of the 3 PM system is to divide original data into 3-bit units to convert them to a 6-bit code as shown in the following 1st Table:

1ST TABLE

| Conversion Algorithm of 3 PM System | | |
|---|---|---|
| Original Data | Converted Code | Conditions |
| 000 | 000010 | When a pattern of "101" |
| 001 | 000100 | is generated in a code |
| 010 | 010000 | sequence after the |
| 011 | 010010 | conversion it is |
| 100 | 001000 | changed to "010" |
| 101 | 100000 | |
| 110 | 100010 | |
| 111 | 100100 | |

Furthermore a sequence of codes converted according to each of the encoding systems is such that recording currents are generated and recorded on a record medium so as to cause an inversion of magnetization with bits of "1" but not to cause an inversion of magnetization with bits of "0". FIGS. 1(c) and (e) are waveforms of the recording currents (NRZI signals) for the code sequences encoded according to the MFM system of FIG. (b) and the 3 PM systems of FIG. (d) respectively.

In the case where the recording is effected on a record medium, (a) if a spacing between the inversions of magnetization (a recording wavelength) is shortened, then the magnetic transitions due to the leading and trailing inversions of magnetization interfere with each other so as to result in a cause for generating errors upon the decoding of a reproduced signal;

(b) even if a demodulation phase margin (Tw) (which will be described later) during the reproduction is small with respect to the spacing between the inversions of magnetization, the abovementioned errors are apt to be caused;

(c) if the spacing between the inversions of magnetization is long as compared with a period of a demodulating clock signal produced from a reproduced signal, then the demodulating clock signal can not be accurately produced from the reproduced signal and the abovementioned errors are apt to be caused; and (d) if the spacing between the inversions of magnetization increases with respect to the ratio of its maximum to its minimum, then the reproduced signal increases in waveform interference (which is called a pattern peak shift) and the abovementioned errors are apt to be caused.

In general encoding systems, therefore, the undermentioned variables are given as the parameters indicating the ability system capability including the four items (a), (b), (c) and (d) as described above. Now assuming that in same encoding system, a sequence of m-bit binary data is converted to a sequence of n-bit binary codes (n≧m) and, between a code bit "1" selected at will from the code sequence after the conversion and a code bit "1" next developed, there exist code bits "0" whose number has a minimum of d and a maximum of k, then the following expressions (1) to (4) hold:

$$T_{min} \begin{pmatrix} \text{spacing between} \\ \text{inversions of minimum} \\ \text{magnetization} \end{pmatrix} = \frac{m}{n}(d+1)T_0 \quad (1)$$

$$T_{max} \begin{pmatrix} \text{spacing between} \\ \text{inversions of maximum} \\ \text{magnetization} \end{pmatrix} = \frac{m}{n}(k+1)T_0 \quad (2)$$

$$C_{LK} \begin{pmatrix} \text{period of demodulating} \\ \text{clock signal} \end{pmatrix} = \frac{m}{n}T_0 \quad (3)$$

and $$T_W \begin{pmatrix} \text{demodulation} \\ \text{phase margin} \end{pmatrix} = \frac{m}{n}T_0 \quad (4)$$

where $T_0$ is a period of the original data.

Accordingly, the foregoing description values of the expressions (1) and (2) are preferably larger (the abovementioned items (a) and (b)) and also the undermentioned ratio of the spacing between the inversions of maximum magnetization to the period of the demodulating clock signal (the expression (5)) and the undermentioned ratio of the spacing between the inversions of maximum magnetization to that between the inversions of minimum magnetization (the expression (6)) are preferably smaller (the abovementioned items (c) and (d)).

$$\frac{T_{max}}{C_{LK}} = \frac{m}{n}(k+1)T_0 / \frac{m}{n}T_0 = k+1 \quad (5)$$

$$\frac{T_{max}}{T_{min}} = \frac{m}{n}(k+1)T_0 / \frac{m}{n}(d+1)T_0 = \frac{k+1}{d+1} \quad (6)$$

With respect to the MFM system, the 3 PM system and the encoding system according to the present invention, the foregoing parameters are shown in the following 2nd Table:

2ND TABLE

Table of Comparison of Parameters in Respective Encoding Systems

| Mod. System | Parameter | | | |
|---|---|---|---|---|
| | Spa. btwn. Invs. of Min. Magzn. | Demodg. Phase Marg. | Spa. btwn. Invs. of Max. Magzn./ Period of Demodg. Clock Sig. | Spa. btwn. Invs. of Max. Magzn./ Spa. btwn. Invs. of Min. Magzn. |
| MFM System | 0.5 $T_0$ | 0.5 $T_0$ | 4 | 2 |
| 3 PM System | 1.5 $T_0$ | 0.5 $T_0$ | 12 | 4 |
| System of This Invention | 1.5 $T_0$ | 0.5 $T_0$ | 9 | 3 |

SUMMARY OF THE INVENTION

An encoding system according to the present invention, upon dividing a binary data sequence at intevals of two bits and converting those divided 2-bit data to codes each consisting of four bits, senses data within six bits preceding and continuous to said 2-bit data and also within succeeding six bits succeeding thereto, utilizes said data thus sensed to convert said 2-bit data to said 4-bit codes and causes not smaller than two to not larger than eight of code bits "0" to exist between any code bit "1" in a sequence of those converted codes and a code bit "0" next developed therein. It has the properties that, as shown in the 2nd Table, it is an improvement over the MFM system in spacing between the inversions of minimum magnetization and is an improvement over the 3 PM system in its ability to produce the demodulating clock signal from a reproduced signal (the spacing between the inversions of maximum magnetization/the period of the demodulating clock signal) and in its ability of reproduced waveforms to avoid interference with one another (the spacing between the insersions of maximum magnetization/the spacing between inversions of minimum magnetization). Also, it can decrease the occurrence of errors during the decoding.

Figure 1:
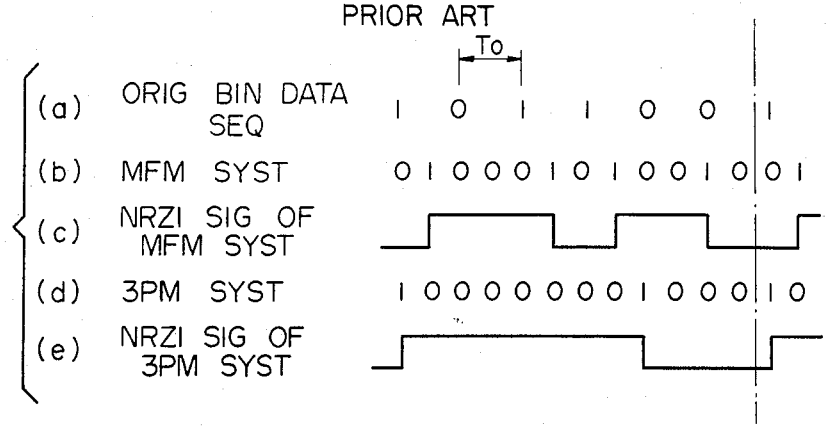
FIGS. 1(a)–(c) are explanatory diagrams of conventional encoding systems of the MFM and 3 PM systems.

The present invention will hereinafter described in detail in conjunction with embodiments shown in the accompanying drawings. The 3rd and 4th Tables below are one concrete example of a conversion algorithm of a novel encoding system. The conversion algorithm divides first original data at intervals of two bits and converts those divided 2-bit data to 4-bit codes following the rule of the 3rd or 4th Table. By observing code sequences converted in accordance with the foregoing conversion algorithm, $T_W = 0.5 T_0$ results because $m/n = 2/4 = 0.5$.

3RD TABLE

Table (1) of Conversion Algorithm of Novel Encoding System

| Original Data | Converted Code | Conditions |
|---|---|---|
| 11 | Y000 | |
| 01 | 0010 | |
| 10 | 0100 | "$E_2E_1$" ≠ "10" and "$L_1L_2$" = "00" |
| 10 | 0001 | "$E_2E_1$" = "10" and "$L_1L_2$" = "0" |
| 10 | 0000 | "$E_2E_1$" = "10", "$L_1L_2$" = "10" and "$L_3L_4$" = "0" |
| 10 | 0100 | "$E_2E_1$" ≠ "10", "$L_1L_2$" = "10" and "$L_3L_4$" = "00" |
| 10 | Y001 | Except the Foregoing |
| 00 | 0000 | "$E_2E_1$" = "10" |
| 00 | 0100 | Except the Foregoing | where
- $E_n$: data bits preceding by n-bits, 2-bit data to be converted in original data sequence
- $L_n$: data bits succeeding by n-bits, 2-bit data to be converted in original data sequence and
- Y: complementary logic of logicl sum of two bits immediately before code bit Y in converted code sequence supplementation
- A: Explanation of $E_1$ to $E_2$ and $L_1$ to $L_2$

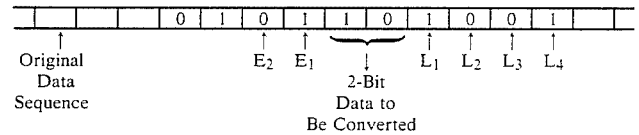

B: Explanation of Y

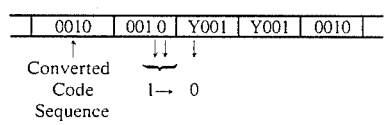

4TH TABLE

Table (2) of Conversion Algorithm of Novel Encoding System

| Original Data | Converted Code | Conditions |
|---|---|---|
| 11 | Y000 | |
| 01 | 0010 | |
| 10 | 0100 | "$E_2E_1$" ≠ "10" and "$L_1L_2$" = "00" |
| 10 | 0001 | "$E_2E_1$" = "10" and "$L_1L_2$" = "00" |
| 10 | 0000 | "$E_2E_1$" = "10", "$L_1L_2$" = "10" and "$L_3L_4$" "00" |
| 10 | 0100 | "$E_2E_1$" ≠ "10", "$L_1L_2$" = "10" and "$L_3L_4$" = "00" |
| 10 | Y001 | Except the Foregoing |

4TH TABLE-continued

| Table (2) of Conversion Algorithm of Novel Encoding System | | |
|---|---|---|
| Original Data | Converted Code | Conditions |
| 00 | 0000 | "$E_2E_1$" = "10" and "$E_4E_3$" ≠ "10" |
| 00 | 0010 | "$E_2E_1$" = "10" and "$E_4E_3$" = "10" |
| 00 | 0100 | Except the Foregoing |

Also, in the case the 3rd Table is used when the conversion gives d and k, original data

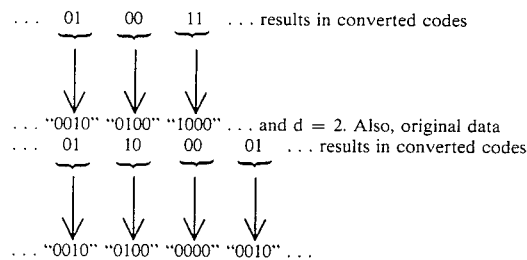

and k=8. In this way d=2 and k=8 are given and it will be understood that the 2nd Table is fulfilled as the abilities of the parameters.

Subsequently, regarding the conversion algorithm shown in the 3rd Table, the ruling property of its conversion is considered. Furthermore, the 4th Table is of a conversion into which the 3rd Table is partly revised and concretely identical to the 3rd Table.

The ruling properly is to divide original data at intervals of two bits and convert them in accordance with the fundamental conversion table of a 5th Table.

5TH TABLE

| Fundamental Conversion Table of Novel Encoding System | |
|---|---|
| Original Data | Converted Code |
| 11 | Y000 |
| 01 | 0010 |
| 10 | Y001 |
| 00 | 0100 |

Y=complementary logic of logical sum of two bits immediately before code bit Y in converted code sequence

| Y | Two Bits Immediately before Code Bit Y |
|---|---|
| 1 | "00" |
| 0 | Except for "00" |

From the fundamental conversion table of the 5th Table, it is understood that not more than d=2 and k=b 8 are satisfied in the conversion unless "10" and "00" express two consecutive patterns each including two bits in the original data to be converted. Therefore, upon the occurrence of the patterns "10" and "00", the conversion of all the patterns is arranged to satisfy d=2 and k=8 by changing the fundamental conversion table of the 5th Table to the revised conversion method as shown in the 3rd and 4th Tables.

Figure 2:
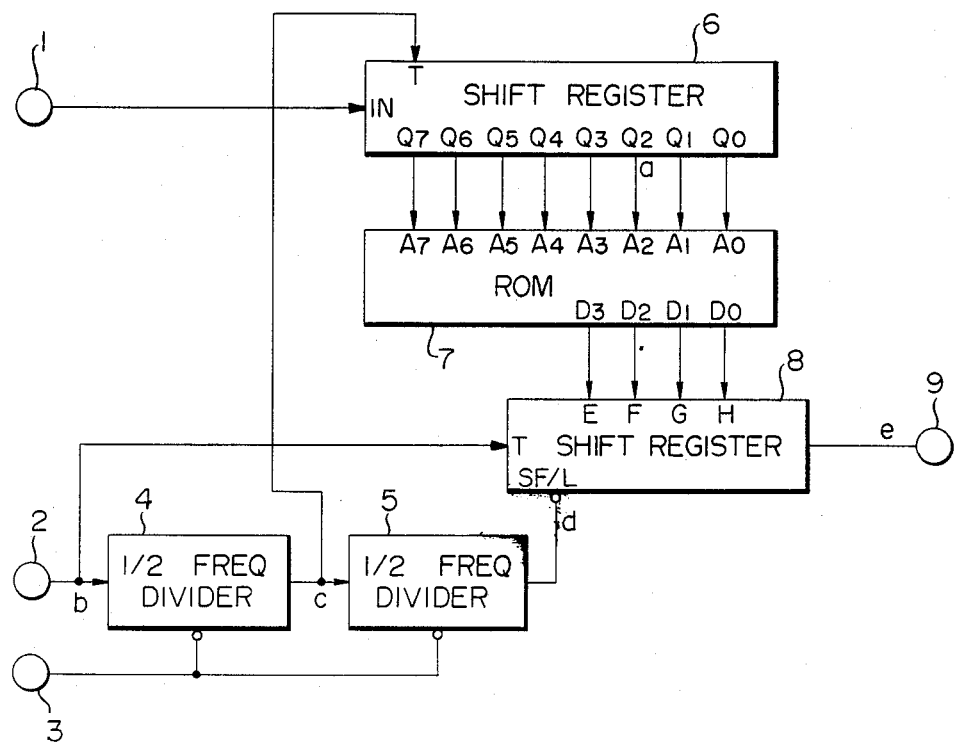
FIG. 2 is a block diagram of one embodiment to which an encoding system according to the present invention is applied.
Figure 4:
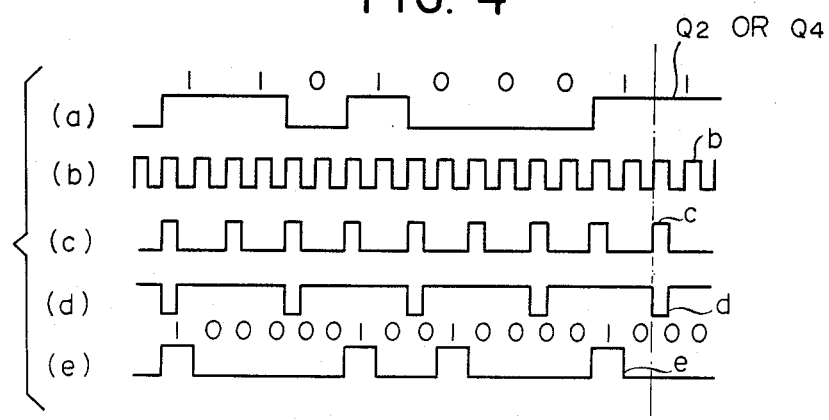
FIGS. 4(a)–(e) are timing charts for explaining the operation of the embodiments shown in FIGS. 2 and 3.

FIG. 2 is a block diagram of one embodiment to which an encoding system according to the present invention is applied and FIGS. 4(a)-(e) are timing charts for explaining its operation. In FIG. 2, the original data are entered into a shift register (6) through an input terminal (1). Also an input terminal 2 has entered thereinto a clock signal b (FIG. 4(b)) which signal doubles a clock signal for the original data; the clock signal b is frequency divided into a signal c with a frequency divided by 2 (FIG. 4(c)) and into a signal d with a frequency divided by 4 (FIG. 4(d)) by ½ frequency dividers (4) and (5) respectively. In the shift register (serial-in-parallel out) (6) the entered original data are delayed one bit at a time by the clock signal c applied to a terminal (T) and delivered through data output terminals ($Q_7$ to $Q_0$). A signal a delivered at that time through the output terminal ($Q_2$) is shown in FIG. 4(a). Data outputs ($Q_7$ to $Q_0$) are entered into input terminals ($A_7$ to $A_0$) of an ROM (a read only memory, for example, TI part number SN74S471N or the like) having an algorithm shown in the 6th Table below and a code converted output signal is provided through its output terminals $D_3$ to $D_0$).

6TH TABLE

| Table (1) of Algorithm of Converting ROM of Novel Encoding System | | | | | | | | | | | |
|---|---|---|---|---|---|---|---|---|---|---|---|
| Input Address | | | | | | | | Output Pattern | | | |
| $A_0$ | $A_1$ | $A_2$ | $A_3$ | $A_4$ | $A_5$ | $A_6$ | $A_7$ | $D_0$ | $D_1$ | $D_2$ | $D_3$ |
| 1 | 1 | 1 | 1 | | | | | 1 | 0 | 0 | 0 |
| 0 | 0 | 1 | 1 | | | | | 1 | 0 | 0 | 0 |
| | | 0 | 1 | | | | | 0 | 0 | 1 | 0 |
| 0 | 0 | 1 | 0 | 0 | 0 | | | 0 | 1 | 0 | 0 |
| 0 | 1 | 1 | 0 | 0 | 0 | | | 0 | 1 | 0 | 0 |
| 1 | 1 | 1 | 0 | 0 | 0 | | | 0 | 1 | 0 | 0 |
| 0 | 0 | 1 | 0 | 1 | 0 | 0 | 0 | 0 | 1 | 0 | 0 |
| 0 | 1 | 1 | 0 | 1 | 0 | 0 | 0 | 0 | 1 | 0 | 0 |
| 1 | 1 | 1 | 0 | 1 | 0 | 0 | 0 | 0 | 1 | 0 | 0 |
| 1 | 1 | 1 | 0 | Z | | | | 1 | 0 | 0 | 1 |
| 0 | 0 | 1 | 0 | Z | | | | 1 | 0 | 0 | 1 |
| 0 | 1 | 1 | 0 | Z | | | | 0 | 0 | 0 | 1 |
| 1 | 0 | 1 | 0 | R | | | | 0 | 0 | 0 | 1 |
| 0 | 0 | 0 | 0 | | | | | 0 | 1 | 0 | 0 |
| 0 | 1 | 0 | 0 | | | | | 0 | 1 | 0 | 0 |
| 1 | 1 | 0 | 0 | | | | | 0 | 1 | 0 | 0 |
| Addresses Except for the Foregoing | | | | | | | | 0 | 0 | 0 | 0 | wherein

Z: All addresses $A_4$ to $A_7$ satisfying the inequalities: "$A_4A_5$"≠"00" and "$A_4A_5A_6A_7$"≠"1000"

R: All addresses $A_4$ to $A_7$ satisfying the inequality: "$A_4A_5A_6A_7$"≠"1000"

and portions with the diagonal lines have no address appointed thereto and therefore can have any value.

This 4-bit output is entered into a shift register (parallel in-serial out) (8) at its resetting terminals (H to E). More specifically, a presetting signal is latched with a synchronized timing signal d (FIG. 4d) applied to a terminal (SF/l) for each of 2-bit data to be converted and converted 4-bit codes are delivered, as a serial output signal e (FIG. 4e), to an output terminal (9) by means of the clock signal b (FIG. 4b) applied to the terminal (T). Furthermore, because of the necessity of causing the right synchronization of two bits of the data to be converted, the ½ frequency dividers (4) and (5) are set in polarity with a synchronization sensing signal (which is entered into an input terminal (3)) such as a data synchronizing signal inserted into the original data sequence for each of predetermined bit lengths.

It will be understood that the pattern (11010001) of the original data shown in FIG. 4(a) is converted to a code pattern (1000001001000010) through that operation.

The 7th and 8th Tables shown below are other concrete examples of the conversion algorithm of the novel encoding system. As in the 3rd and 4th Tables as described above, the original data are first divided at intervals of two bits and those divided 2-bit data are converted to 4-bit codes following the rule of the 7th or 8th Tables. By observing a code sequence converted in accordance with the foregoing conversion algorithm, $T_W = 0.5T_0$ results because $m/n = 2/4 = 0.5$.

7TH TABLE

Table (3) of Conversion Algorithm of Novel Encoding System

| Original Data | Converted Code | Conditions |
|---|---|---|
| 11 | Y000 | |
| 01 | 0010 | |
| 10 | 0100 | "$E_2E_1$" ≠ "10" and "$L_1L_2$" = "00" |
| 10 | 0001 | "$E_2E_1$" = "10" and "$L_1L_2$" = "00" |
| 10 | 0000 | "$E_2E_1$" = "10", "$L_1L_2$" = "10" and "$L_3L_4$" = "00" |
| 10 | 0100 | "$E_2E_1$" ≠ "10", "$L_1L_2$" = "10" and "$L_3L_4$" = "00" |
| 10 | Y001 | Except the Foregoing |
| 00 | 0000 | "$E_4E_3$" ≠ "10", "$E_2E_1$" = "10" and "$L_1L_2$" ≠ "01" |
| 00 | 0001 | "$E_4E_3$" ≠ "10", "$E_2E_1$" = "10" and "$L_1L_2$" = "01" |
| 00 | 0000 | "$E_2E_1$" = "10" |
| 00 | 0100 | Except the Foregoing |

8TH TABLE

Table (4) of Conversion Algorithm of Novel Encoding System

| Original Data | Converted Code | Conditions |
|---|---|---|
| 11 | Y000 | |
| 01 | 0000 | "$E_6E_5$" ≠ "10", "$E_4E_3$" = "10" and "$E_2E_1$" = "00" |
| 01 | 0010 | Except the Foregoing |
| 10 | 0100 | "$E_2E_1$" ≠ "10" and "$L_1L_2$" = "00" |
| 10 | 0001 | "$E_2E_1$" = "10" and "$L_1L_2$" = "00" |
| 10 | 0000 | "$E_2E_1$" = "10", "$L_1L_2$" = "10" and "$L_3L_4$" = "00" |
| 10 | 0100 | "$E_2E_1$" ≠ "10", "$L_1L_2$" = "10" and "$L_3L_4$" = "00" |
| 10 | Y001 | Except the Foregoing |
| 00 | 0000 | "$E_4E_3$" ≠ "10", "$E_2E_1$" = "10" and "$L_1L_2$" ≠ "01" |
| 00 | 0001 | "$E_4E_3$" ≠ "10", "$E_2E_1$" = "10" and "$L_1L_2$" = "01" |
| 00 | 0010 | "$E_4E_3$" = "10" and "$E_2E_1$" = 10 |
| 00 | 0100 | Except the Foregoing |

Also in the case where the 7th Table is used when the conversion gives d and k, original data

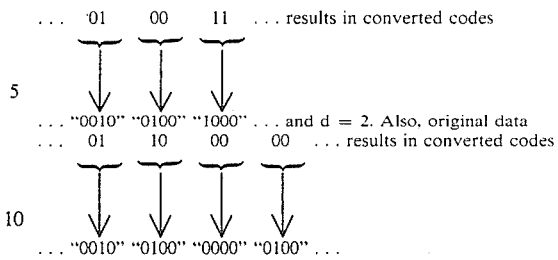

... 01 00 11 ... results in converted codes

... "0010" "0100" "1000" ... and d = 2. Also, original data
... 01 10 00 00 ... results in converted codes

... "0010" "0100" "0000" "0100" ...

and k = 7.

It is understood that d = 2 and k = 7 are given in this way and satisfy the 2nd Table.

Then, regarding the conversion algorithm shown in the 7th Table, the ruling property of its conversion is considered. The 8th Table is a conversion into which the 7th Table has been partly revised and basically the same as the 7th Table.

From the fundamental conversion table of the 5th Table, it is understood that d = 2 and k = 7 are satisfied in the conversions except for the pattern ("10" "00") of the original data to be converted. Therefore, upon the occurrence of the pattern ("10" "00"), d = 2 and k = 7 are caused to be satisfied in all the conversions of the patterns by changing the fundamental conversion table of the 5th Table to the revised conversion methods as shown in the 7th and 8th Tables.

Figure 3:
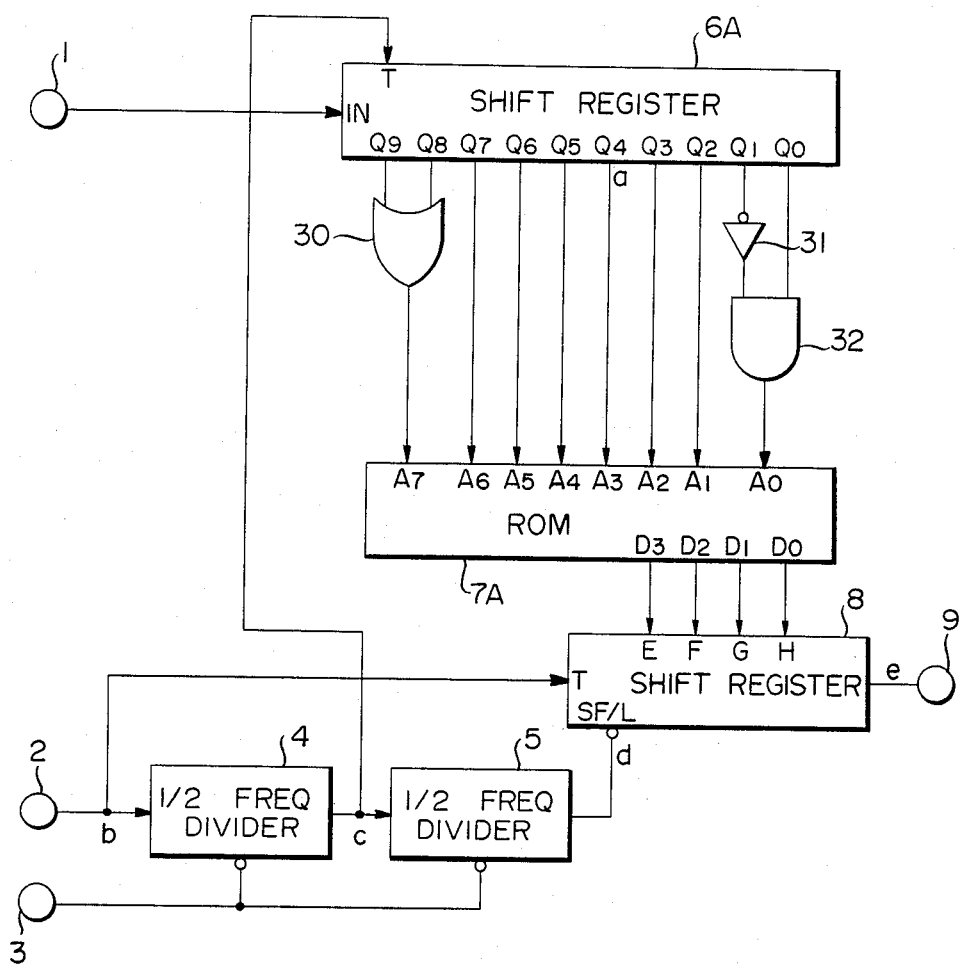
FIG. 3 is a block diagram of another embodiment to which another encoding system according to the present invention is applied.

FIG. 3 is a block diagram of another embodiment to which another encoding system according to the present invention is applied and the timing charts of FIGS. 4(a)-(e) are also used with that embodiment. Differences between the other embodiment shown in FIG. 3 and the one embodiment shown in FIG. 2 reside in the fact that (a) a shift register (6A) has, in addition to the output terminals ($Q_7$ to $Q_0$), output terminals ($Q_9$ to $Q_8$), (b), an OR gate (30), a NOT gate (31) and an AND gate (32) newly added thereto (As a result, the output terminal $Q_0$ is directly connected to one input of the AND gate (32), the output terminal ($Q_1$) is connected to another input of the AND gate (32) through the NOT gate (31), an output terminal of the AND gate (32) is connected to an input terminal ($A_0$) of a ROM (7A), each of the output terminals ($Q_2$ to $Q_7$) is individually connected to each of the input terminals ($A_1$ to $A_6$), the output terminal ($Q_8$) is connected to one input of the OR gate (30), the output terminal ($Q_9$) is connected to another input terminal of the OR gate (3) and an output terminal of the OR gate (30) is connected to the input terminal ($A_7$)), (c) the signal a shown in FIG. 4(a) is obtained at the output terminal ($Q_4$), and (d) the ROM (7A) has an alogrithm as shown in the following 9th Table.

9TH TABLE

Table (2) of Algorithm of Converting ROM of Novel Encoding System

| No. | Input Address | | | | | | | | Output Pattern | | | | Conditions for Input Address |
|---|---|---|---|---|---|---|---|---|---|---|---|---|---|
| | $A_0$ | $A_1$ | $A_2$ | $A_3$ | $A_4$ | $A_5$ | $A_6$ | $A_7$ | $D_0$ | $D_1$ | $D_2$ | $D_3$ | |
| 1 | 1 | 1 | 1 | 1 | | | | | 1 | 0 | 0 | 0 | |
| 2 | 0 | 0 | 1 | 1 | | | | | 1 | 0 | 0 | 0 | |
| 3 | 0 | 1 | 1 | 1 | | | | | 0 | 0 | 0 | 0 | |
| 4 | 1 | 0 | 1 | 1 | | | | | 0 | 0 | 0 | 0 | |
| 5 | | | 0 | 1 | | | | | 0 | 0 | 1 | 0 | |
| 6 | 1 | 0 | 1 | 0 | 0 | | | | 0 | 1 | 0 | 0 | Except Address "$A_1A_2$" = "10" |
| 7 | 1 | 0 | 1 | 0 | 0 | | | | 0 | 0 | 0 | 1 | |
| 8 | 1 | 0 | 1 | 0 | 1 | 0 | 0 | | 0 | 0 | 0 | 0 | |

9TH TABLE-continued

Table (2) of Algorithm of Converting ROM of Novel Encoding System

| No. | \multicolumn{8}{c}{Input Address} | \multicolumn{4}{c}{Output Pattern} | Conditions for Input Address |
|---|---|---|---|---|---|---|---|---|---|---|---|---|---|
| | $A_0$ | $A_1$ | $A_2$ | $A_3$ | $A_4$ | $A_5$ | $A_6$ | $A_7$ | $D_0$ | $D_1$ | $D_2$ | $D_3$ | |
| 9 | | 1 | 0 | 1 | 0 | 1 | 0 | 0 | 0 | 1 | 0 | 0 | Except Address "$A_1A_2$" = "10" |
| 10 | | 1 | 1 | 1 | 0 | | | | 1 | 0 | 0 | 1 | Except Addresses shown by Nos. 6 to 9 |
| 11 | | 0 | 0 | 1 | 0 | | | | 1 | 0 | 0 | 1 | Except Addresses shown by Nos. 6 to 9 |
| 12 | | 0 | 1 | 1 | 0 | | | | 0 | 0 | 0 | 1 | Except Addresses shown by Nos. 6 to 9 |
| 13 | | 1 | 0 | 1 | 0 | | | | 0 | 0 | 0 | 1 | Except Addresses shown by Nos. 6 to 9 |
| 14 | 0 | 1 | 0 | 0 | 0 | 0 | 1 | | 0 | 0 | 0 | 0 | Except Address "$A_5A_6$" = "01" |
| 15 | 0 | 1 | 0 | 0 | 0 | 0 | 1 | | 0 | 0 | 0 | 1 | |
| 16 | 1 | 1 | 0 | 0 | 0 | | | | 0 | 0 | 0 | 0 | |
| 17 | | | 0 | 0 | | | | | 0 | 1 | 0 | 0 | Except Addresses shown by Nos. 14 to 16 |
| 18 | \multicolumn{8}{l}{The Foregoing Excepted} | 0 | 0 | 0 | 0 | | where $A_0 = Q_0 \times \overline{Q}_1$, $A_1 = Q_2$, $A_2 = Q_3$, $A_3 = Q_4$, $A_4 = Q_5$, $A_5 = Q_6$, $A_6 = Q_7$ and $A_7 = Q_8 + Q_9$ Portions with diagonal lines can have any logic value.

It will be understood through that operation, that the pattern (11010001) of the original data shown in FIG. 4(a) is converted to a code pattern (10000010011000010) shown in FIG. 4(e) as in the embodiment of FIG. 2.

Figure 5:
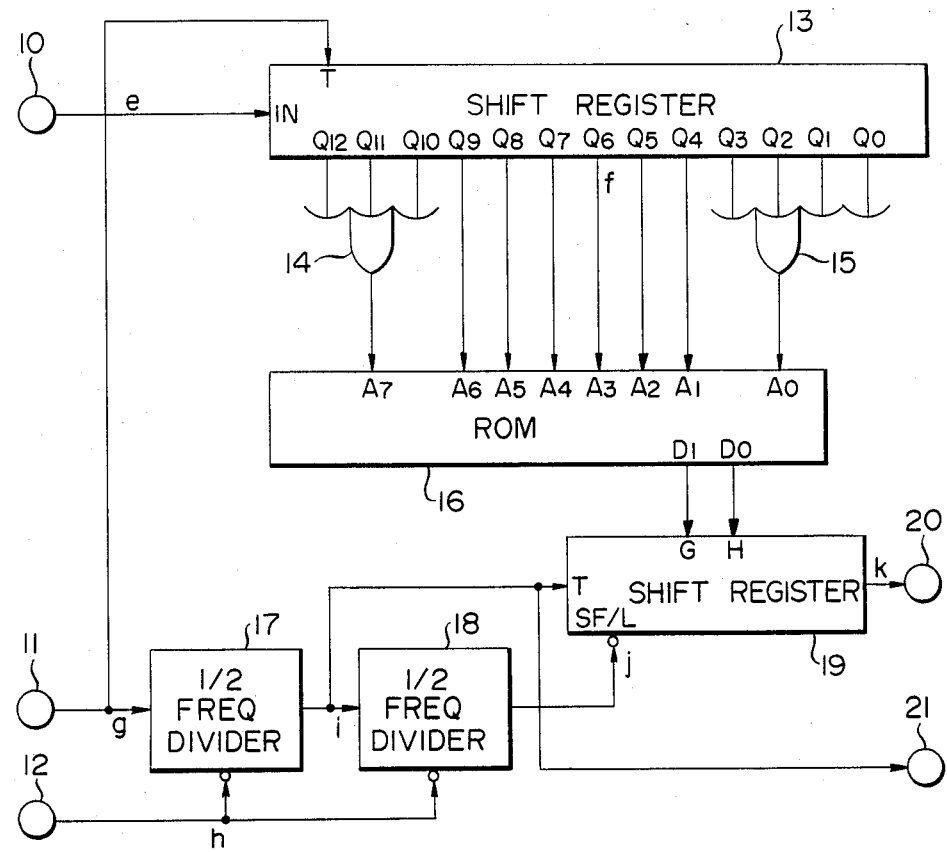
FIG. 5 is a block diagram of one embodiment to which a decoding system according to the present invention is applied.
Figure 6:
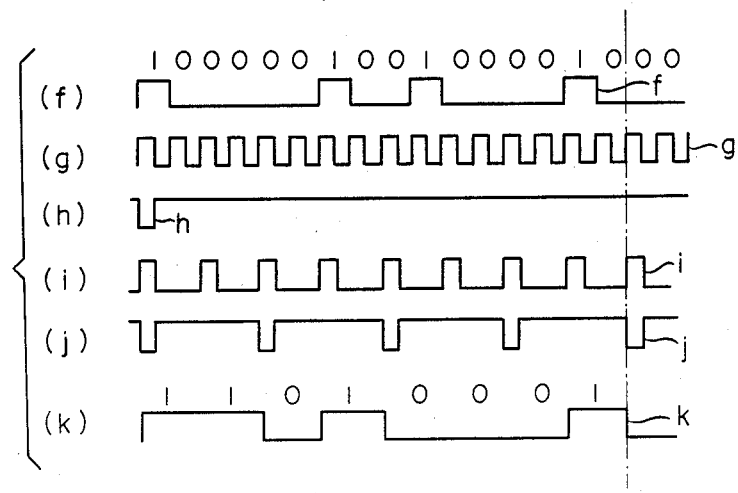
FIGS. 6(f)–(k) are timing charts for explaining the operation of the embodiment shown in FIG. 6.

Then, FIG. 5 shows a block diagram of one embodiment to which a decoding system according to the present invention is applied and FIGS. 6(f)–(k) show timing charts for explaining the operation thereof. First, a converted code sequence (FIG. 4(e)) is entered into an input terminal (10) and a clock signal g (FIG. 6(g)) synchronized therewith is entered into an input terminal (11). Then, as during the encoding, the clock signal g is frequency divided into a signal i with a frequency divided by 2 (FIG. 6(i)) and a signal j with a frequency divided by 4 (FIG. 6(j)) by ½ frequency dividers (17) and (18) respectively. Also, the entered converted code sequence is delayed one bit at a time within a shift register (serial in-parallel out) (13) with the clock signal g applied to a terminal (T) and delivered through the output terminals ($Q_{12}$ to $Q_0$). (Assuming that $Q_0$ designates that output terminal through which the longest signal delayed is delivered, the delay is rendered smaller in the order of $Q_1$, $Q_{12}$.) It is now assumed that a signal A shown in FIG. 4(f) is being delivered to the output terminal ($Q_6$). On the other hand, signals at the output terminals ($Q_0$ to $Q_3$) are combined into the logical sum by an OR gate (15) after which it is entered into an input terminal ($A_0$) of an ROM (TI part number SN 745471 firm or the like) Also, the signals at the output terminals ($Q_4$ to $Q_9$) are entered into the input terminals ($A_1$ to $A_6$) while the signals at the output terminals ($Q_{10}$ to $Q_{12}$) are combined into the logical sum by an OR gate (14) whose output is entered into the input terminal ($A_7$). The ROM (16) has a decoding conversion algorithm shown below in the 10th or 11th Tables:

10TH TABLE

Table (1) of Decoding Algorithm of Converting ROM of Novel Encoding System

| \multicolumn{8}{c}{Input Address} | \multicolumn{2}{c}{Output Pattern} |
|---|---|---|---|---|---|---|---|---|---|
| $A_0$ | $A_1$ | $A_2$ | $A_3$ | $A_4$ | $A_5$ | $A_6$ | $A_7$ | $D_0$ | $D_1$ |
| | | | 1 | 0 | 0 | 0 | | 1 | 1 |
| | | | 0 | 0 | 1 | 0 | | 0 | 1 |
| | | | 0 | 0 | 0 | 0 | 0 | 1 | 0 |
| | | 0 | 1 | 0 | 0 | 0 | | 1 | 0 |
| | | | 0 | 0 | 1 | | | 1 | 0 |
| | 1 | 0 | 0 | 0 | 0 | 0 | 1 | 1 | 1 |
| 1 | 0 | 1 | 0 | 0 | 0 | 0 | 1 | 1 | 1 |
| \multicolumn{8}{l}{Addresses Except for the Foregoing} | 0 | 0 |

The decoding algorithm of the 10th Table is used upon decoding the code sequence converted by the embodiment of FIG. 5 and has an algorithm by which a decoding 4-bit codes (specified by the addresses $A_3$ to $A_6$) for the converted code sequence are decoded into the original 2-bit data in accordance with the conditions for a preceding and a succeeding code pattern (specified by the addresses $A_0$, $A_1$, $A_2$ and $A_7$). A decoded pattern is delivered to output terminals ($D_0$ and $D_1$). This decoding algorithm of the converting ROM changes the output pattern through an algorithm of a preceeding and a succeeding pattern (specified by the address $A_0$, $A_1$, $A_2$, or $A_7$) only for two specified types of address patterns "$A_3$ to $A_6$" = "0000" and = "0100" among the 4-bit codes to be converted (specified by the addresses $A_3$ to $A_6$). A decoded output signal is entered into a shift register (parallel in-serial out) (19) at presetting terminals (G to H). On the other hand, the ½ frequency dividers (17) and (18) are put in synchronization with each other with a synchronizing signal h (entered into an input terminal (12) and shown in FIG. 6(h)) and generate a signal i with a frequency divided by 2 (FIG. 6(i)) and a signal j with a frequency divided by 4 (FIG. 6(j)) respectively. The shift register (19) latches presetting input signals thereto that is, signals at input terminals (H and G) with the timing signal j applied to its terminal (SF/L) and also delivers to an output terminal (2) data k (FIG. 6(k)) decoded with the demodulating clock signal i applied to its terminal (T) The decoding clock signal i is delivered to a clock output terminal (20). By viewing this status in the timing charts of FIGS. 6(f)–(k), it will be understood that a pattern (10000010010000010) of the entered converted code sequence (=f) is decoded as decoded data k (11010001).

11TH TABLE

Table (2) of Decoding Algorithm of Converting ROM of Novel Encoding System

| \multicolumn{8}{c|}{Input Address} | \multicolumn{2}{c}{Output Pattern} |
|---|---|---|---|---|---|---|---|---|---|
| $A_0$ | $A_1$ | $A_2$ | $A_3$ | $A_4$ | $A_5$ | $A_6$ | $A_7$ | $D_0$ | $D_1$ |
|   |   |   | 1 | 0 | 0 | 0 |   | 1 | 1 |
| 1 | 0 | 1 | 0 | 0 | 0 | 0 | 1 | 1 | 1 |
|   | 1 | 0 | 0 | 0 | 0 | 0 | 1 | 1 | 1 |
|   |   |   | 0 | 0 | 1 | 0 |   | 0 | 1 |
|   |   |   | 0 | 1 | 0 | 0 | 0 | 1 | 0 |
| 1 | 0 | 0 | 0 | 0 | 0 | 1 | 0 | 1 | 0 |
|   | 0 | 1 | 0 | 0 | 0 | 0 | 0 | 1 | 0 |
|   |   |   | 1 | 0 | 0 | 1 |   | 1 | 0 |
|   | 0 | 1 | 0 | 0 | 0 | 1 |   | 1 | 0 |
|   | 1 | 0 | 0 | 0 | 0 | 1 |   | 1 | 0 |
| \multicolumn{8}{c|}{The Foregoing Excepted} | 0 | 0 |

The decoding algorithm of the 11th Table is used in decoding the code sequence converted by the embodiment of FIG. 5 and has an algorithm by which decoding 4-bit codes (specified by the addresses $A_3$ to $A_6$) are decoded into the original 2-bit data in accordance with the conditions for a preceeding and a succeeding code pattern (specified by the addresses $A_0$, $A_1$, $A_2$ and $A_7$). A decoded pattern is delivered to the output terminals ($D_0$ and $D_1$). This decoding algorithm of the converting ROM changes the output patterns through an algorithm of a preceeding and a succeeding pattern (specified by the address $A_0$, $A_1$, $A_2$ or $A_7$) only for three specified types of the address patterns "$A_3$ to $A_6$"="0000",="0100" and "0001" among the 4-bit codes to be decoded (specified by the addresses $A_3$ to $A_6$). By viewing this status in the timing charts of FIGS. 6(f)-(f), it will be understood that, as during the decoding by the embodiment of FIG. 2, a pattern (1000001001000010) of the entered decoded code sequence (=f) is decoded as decoded data k (11010001).

Furthermore the 3rd and 4th Tables for the encoding algorithms used for the purpose of describing the present invention are one concrete example of the present invention and the 7th and 8th Tables are other concrete examples of the present inventon. Still another encoding algorithm may be used. That is, it is evident that in the encoding system, first, combinations of the original data patterns with the converted codes in the 3rd and 4th Tables as well as in the 7th and 8th Tables are possible to be any combination of four types of patterns formed of two bits as four types of patterns shown by the original data. Also, the logical algorithm and conditions of the converted codes reverse in order with respect to all the data. That is, for example, a converted code (Y001) is changed to (100Z) and $(E_2E_1) \rightarrow (L_1L_2)$, $(L_1L_2) \rightarrow (E_2E_1)$, $(L_3L_4) \rightarrow (E_4E_3)$ and $(E_4E_3) \rightarrow (L_3L_4)$ are effected. However, Z at that time makes a complementary logic of the two bits immediately after the code bit Z in the converted code sequence. It is evident that the encoding system of the present invention may be formed of such an encoding method. Also, even if the encoding patterns of the 3rd and 7th Tables are partly revised and changed as in the 4th and 8th Tables, there may be composed a similar encoding system having the ability to insure that d=2, k=8 and k=7 as predetermined.

As described above, the encoding and decoding systems of the present invention have the excellent ability, as a high density magnetic recording system, as compared with other conventional modulation systems such as in the 2nd Table, and a construction of the hardware is much simplified. Thus, its practical merit is very large.

I claim:

1. A binary data encoding system comprising:
    a data input for receiving serial binary data to be encoded;
    a clock input for receiving a digital clock signal;
    a reset signal input for receiving a reset signal;
    a serial to parallel shift register having a data input connected to said binary input and having eight outputs which are designated $Q_0$-$Q_7$;
    a read only memory having eight inputs which are designated $A_0$-$A_7$ and which are aperatively respectively connected to said eight outputs of said serial to parallel shift register and having four outputs which are designated $D_0$-$D_3$, wherein said read only memory has the following characteristics:

| \multicolumn{8}{c|}{Input Address} | \multicolumn{4}{c}{Output Pattern} |
|---|---|---|---|---|---|---|---|---|---|---|---|
| $A_0$ | $A_1$ | $A_2$ | $A_3$ | $A_4$ | $A_5$ | $A_6$ | $A_7$ | $D_0$ | $D_1$ | $D_2$ | $D_3$ |
| 1 | 1 | 1 | 1 |   |   |   | 1 | 1 | 0 | 0 | 0 |
| 0 | 0 | 1 | 1 |   |   |   |   | 1 | 0 | 0 | 0 |
|   |   | 0 | 1 |   |   |   |   | 0 | 0 | 1 | 0 |
| 0 | 0 | 1 | 0 | 0 | 0 |   |   | 0 | 1 | 0 | 0 |
| 0 | 1 | 1 | 0 | 0 | 0 |   |   | 0 | 1 | 0 | 0 |
| 1 | 1 | 1 | 0 | 0 | 0 | 0 |   | 0 | 1 | 0 | 0 |
| 0 | 0 | 1 | 0 | 1 | 0 | 0 | 0 | 0 | 1 | 0 | 0 |
| 0 | 1 | 1 | 0 | 1 | 0 | 0 | 0 | 0 | 1 | 0 | 0 |
| 1 | 1 | 1 | 0 | 1 | 0 | 0 | 0 | 0 | 1 | 0 | 0 |
| 1 | 1 | 1 | 0 |   | Z |   |   | 1 | 0 | 0 | 1 |
| 0 | 0 | 1 | 0 |   | Z |   |   | 1 | 0 | 0 | 1 |
| 0 | 1 | 1 | 0 |   | Z |   |   | 0 | 0 | 0 | 1 |
| 1 | 0 | 1 | 0 |   | R |   |   | 0 | 0 | 0 | 1 |
| 0 | 0 | 0 | 0 |   |   |   |   | 0 | 1 | 0 | 0 |
| 0 | 1 | 0 | 0 |   |   |   |   | 0 | 1 | 0 | 0 |
| 1 | 1 | 0 | 0 |   |   |   |   | 0 | 1 | 0 | 0 |
| \multicolumn{8}{c|}{Addresses Except for the Foregoing} | 0 | 0 | 0 | 0 | wherein
Z: all addresses $A_4$ to $A_7$ satisfying the inequalities: "$A_4A_5$"≠"00" and "$A_4A_5A_6A_7$"≠"1000"
R: all addresses $A_4$ to $A_7$ satisfying the inequality: "$A_4A_5A_6A_7$"≠"1000"
and portions with the diagonal lines can have any value;
a parallel to serial shift register having four inputs which are designated E-H and which are respectively operatively connected to said four outputs of said read only memory and having an output comprising an output of said binary data encoding system and having a shift clock input operatively connected to said clock input;
a first frequency divider having its input connected to said clock input and having its output connected to a shift clock input of said serial to parallel shift register and having a reset input connected to said reset input, said first frequency divider dividing the frequency of said digital clock signal by a factor of two;
a second frequency divider whose input is operatively connected to said output of said first frequency divider and whose output is connected to a shift/latch input of said parallel to serial shift register and having a reset input operatively connected to said reset input of said system, said second frequency divider dividing the frequency of a signal input thereto by a factor of two.

2. A binary data encoding system comprising:
a data input for receiving serial binary data to be encoded;
a clock input for receiving a digital clock signal;
a reset signal input for receiving a reset signal;
a serial to parallel shift register having a data input connected to said binary input and having ten outputs which are designated $Q_0$-$Q_9$;
a read only memory having eight inputs which are designated $A_0$-$A_7$ and which are operatively connected to said ten outputs of said serial to parallel shift register and having four outputs which are designated $D_0$-$D_3$, wherein said outputs $Q_2$-$Q_7$ are respectively directly connected to inputs $A_1$-$A_6$ and said outputs $Q_8$ and $Q_9$ are connected to said input $A_7$ via an OR gate and said output $Q_1$ is inverted by a NOT gate and combined with said output $Q_0$ in an AND gate and input to said input $A_0$, and wherein said read only memory has the following characteristics:

| No. | $A_0$ | $A_1$ | $A_2$ | $A_3$ | $A_4$ | $A_5$ | $A_6$ | $A_7$ | $D_0$ | $D_1$ | $D_2$ | $D_3$ | Conditions for Input Address |
|---|---|---|---|---|---|---|---|---|---|---|---|---|---|
| 1 | 1 | 1 | 1 | 1 | | | | | 1 | 0 | 0 | 0 | |
| 2 | 0 | 0 | 1 | 1 | | | | | 1 | 0 | 0 | 0 | |
| 3 | 0 | 1 | 1 | 1 | | | | | 0 | 0 | 0 | 0 | |
| 4 | 1 | 0 | 1 | 1 | | | | | 0 | 0 | 0 | 0 | |
| 5 | | | 0 | 1 | | | | | 0 | 0 | 1 | 0 | |
| 6 | 1 | 0 | 1 | 0 | 0 | 0 | | | 0 | 1 | 0 | 0 | Except Address "$A_1A_2$" = "10" |
| 7 | 1 | 0 | 1 | 0 | 0 | 0 | | | 0 | 0 | 0 | 1 | |
| 8 | 1 | 0 | 1 | 0 | 1 | 0 | 0 | | 0 | 0 | 0 | 0 | |
| 9 | 1 | 0 | 1 | 0 | 1 | 0 | 0 | | 0 | 1 | 0 | 0 | Except Address "$A_1A_2$" = "10" |
| 10 | 1 | 1 | 1 | 0 | | | | | 1 | 0 | 0 | 1 | Except Addresses shown by Nos. 6 to 9 |
| 11 | 0 | 0 | 1 | 0 | | | | | 1 | 0 | 0 | 1 | Except Addresses shown by Nos. 6 to 9 |
| 12 | 0 | 1 | 1 | 0 | | | | | 0 | 0 | 0 | 1 | Except Addresses shown by Nos. 6 to 9 |
| 13 | 1 | 0 | 1 | 0 | | | | | 0 | 0 | 0 | 1 | Except Addresses shown by Nos. 6 to 9 |
| 14 | 0 | 1 | 0 | 0 | 0 | 0 | 1 | | 0 | 0 | 0 | 0 | Except Address "$A_5A_6$" = "01" |
| 15 | 0 | 1 | 0 | 0 | 0 | 0 | 1 | | 0 | 0 | 0 | 1 | |
| 16 | 1 | 1 | 0 | 0 | 0 | | | | 0 | 0 | 0 | 0 | |
| 17 | | | 0 | 0 | | | | | 0 | 1 | 0 | 0 | Except Addresses shown by Nos. 14 to 16 |
| 18 | The Foregoing Excepted | | | | | | | | 0 | 0 | 0 | 0 | | where $A_0 = Q_0 \times \overline{Q_1}$, $A_1 = Q_2$, $A_2 = Q_3$, $A_3 = Q_4$, $A_4 = Q_5$, $A_5 = Q_6$, $A_6 = Q_7$ and $A_7 = Q_8 + Q_9$
portions with diagonal lines can have any logic value;
a parallel to serial shift register having four inputs which are designated E-H and which are respectively operatively connected to said four outputs of said read only memory and having an output comprising an output of said binary data encoding system and having a shift clock input operatively connected to said clock input;
a first frequency divider having its input connected to said clock input and having its output connected to a shift clock input of said serial to parallel shift register and having a reset input connected to said reset input, said first frequency divider dividing the frequency of said digital clock signal by a factor of two;
a second frequency divider whose input is operatively connected to said output of said first frequency divider and whose output is connected to a shift/latch input of said parallel to serial shift register and having a reset input operatively connected to said reset input of said system, said second frequency divider dividing the frequency of a signal input thereto by a factor of two.

3. A binary data encoding system comprising:
a data input for receiving serial binary data to be encoded;
a clock input for receiving a digital clock signal;
a reset signal input for receiving a reset signal;
a serial to parallel shift register having a data input connected to said binary input and having a shift clock input connected to said clock input and having thirteen outputs which are designated $Q_0$-$Q_{12}$;
a read only memory having eight inputs which are designated $A_0$-$A_7$ and which are operatively connected to said thirteen outputs of said serial to parallel shift register and having two outputs which are designated $D_0$-$D_1$, wherein said outputs $Q_4$-$Q_9$ are respectively directly connected to inputs $A_1$-$A_6$ and said outputs $Q_{10}$-$Q_{12}$ are connected to said input $A_7$ via a first OR gate and said outputs $Q_0$-$Q_3$ are connected to said input $A_0$ via a said OR gate, and wherein said read only memory has the following characteristics:

| $A_0$ | $A_1$ | $A_2$ | $A_3$ | $A_4$ | $A_5$ | $A_6$ | $A_7$ | $D_0$ | $D_1$ |
|---|---|---|---|---|---|---|---|---|---|
| | | | 1 | 0 | 0 | 0 | | 1 | 1 |
| | | | 0 | 0 | 1 | 0 | | 0 | 1 |
| | | | 0 | 0 | 0 | 0 | 0 | 1 | 0 |
| | | | 0 | 1 | 0 | 0 | 0 | 1 | 0 |
| | | | | 0 | 0 | 1 | 0 | 1 | 0 |
| | 1 | 0 | 0 | 0 | 0 | 0 | 1 | 1 | 1 |
| 1 | 0 | 1 | 0 | 0 | 0 | 0 | 1 | 1 | 1 |
| Addresses Except for the Foregoing | | | | | | | | 0 | 0 | a parallel to serial shift register having two inputs which are designated G–H and which are respectively operatively connected to said outputs $D_1$ and $D_0$ of said read only memory and having an output comprising an output of said binary data encoding system and having a shift clock input operatively connected to an output of a first frequency divide;

said first frequency divided have its input connected to said clock input and having its output comprising another output of said binary data encoding system and being connected to an input of a second frequency divider and having a reset input connected to said reset input, said first frequency divider dividing the frequency of said digital clock signal by a factor of two;

said second frequency divider having an output connected to a shift/latch input of said parallel to serial shift register and having a reset input operatively connected to said reset input of said system, said second frequency divider dividing the frequency of a signal input thereof by a factor of two.

4. A binary data encoding system for converting an original two bit data sequence to a converted four bit code comprising:

a means for converting a serial data input containing
a means for converting a serial data input containing said original data sequence to a parallel form;
a converter means operatively connected to said serial to parallel means for converting a parallel output of said serial to parallel converter means to a different parallel form;
and a parallel to serial converter means operatively connected to said converter means for converting a parallel output of said converter means to a serial output containing said converted code;
wherein said original data sequence is converted to a converted code in accordance with the following:

| Original Data | Converted Code | Conditions |
|---|---|---|
| 11 | Y000 | |
| 01 | 0010 | |
| 10 | 0100 | "$E_2E_1$" ≠ "10" and "$L_1L_2$" = "00" |
| 10 | 0001 | "$E_2E_1$" = "10" and "$L_1L_2$" = "00" |
| 10 | 0000 | "$E_2E_1$" = "10", "$L_1L_2$" = "10" and "$L_3L_4$" = "00" |
| 10 | 0100 | "$E_2E_1$" ≠ "10", "$L_1L_2$" = "10" and "$L_3L_4$" = "00" |
| 10 | Y001 | Except the Foregoing |
| 00 | 0000 | "$E_2E_1$" = "10" |
| 00 | 0100 | Except the Foregoing | where
$E_n$: data bits preceding by n-bits, 2-bit data to be converted in original data sequence
$L_n$: data bits succeeding by n-bits, 2-bit data to be converted in original data sequence and
Y: complement logic of logical sum of two bits immediately before code bit Y in converted code sequence supplimentation;

a parallel to serial shift register having two inputs which are designated G–H and which are respectively operatively connected to said outputs $D_1$ and $D_0$ of said read only memory and having an output comprising an output of said binary data encoding system and having a shift clock input operatively connected to an output of a first frequency divide;

said first frequency divided have its input connected to said clock input and having its output comprising another output of said binary data encoding system and being connected to an input of a second frequency divider and having a reset input connected to said reset input, said first frequency divider dividing the frequency of said digital clock signal by a factor of two;

said second frequency divider having an output connected to a shift/latch input of said parallel to serial shift register and having a reset input operatively connected to said reset input of said system, said second frequency divider dividing the frequency of a signal input thereto by a factor of two.

5. A binary data encoding system for converting an original two bit data sequence to a converted four bit code comprising:

a means for converting a serial data input containing said original data sequence to a parallel form;
a converter means operatively connected to said serial to parallel means for converting a parallel output of said serial to parallel converter means to a different parallel form;
and a parallel to serial converter means operatively connected to said converter means for converting a parallel output of said converter means to a serial output containing said converted code;
wherein said original data sequence is converted to a converted code in accordance with the following:

| Original Data | Converted Code | Conditions |
|---|---|---|
| 11 | Y000 | |
| 01 | 0010 | |
| 10 | 0100 | "$E_2E_1$" ≠ "10" and "$L_1L_2$" = "00" |
| 10 | 0001 | "$E_2E_1$" = "10" and "$L_1L_2$" = "00" |
| 10 | 0000 | "$E_2E_1$" = "10", "$L_1L_2$" = "10" and "$L_3L_4$" = "00" |
| 10 | 0100 | "$E_2E_1$" ≠ "10", "$L_1L_2$" = "10" and "$L_3L_4$" = "00" |
| 10 | Y001 | Except the Foregoing |
| 00 | 0000 | "$E_2E_1$" = "10" and "$E_4E_3$" ≠ "10" |
| 00 | 0010 | "$E_2E_1$" = "10" and "$E_4E_3$" = "10" |
| 00 | 0100 | Except the Foregoing | where
$E_n$: data bits preceding by n-bits, 2-bit data to be converted in original data sequence
$L_n$: data bits succeeding by n-bits, 2-bit data to be converted in original data sequence and
Y: complement logic of logical sum of two bits immediately before code bit Y in converted code sequence supplimentation;

a parallel to serial shift register having two inputs which are designated G–H and which are respectively operatively connected to said outputs $D_1$ and $D_0$ of said read only memory and having an output comprising an output of said binary data encoding system and having a shift clock input operatively connected to an output of a first frequency divide;

said first frequency divided have its input connected to said clock input and having its output comprising another output of said binary data encoding system and being connected to an input of a second frequency divider and having a reset input connected to said reset input, said first frequency divider dividing the frequency of said digital clock signal by a factor of two;

said second frequency divider having an output connected to a shift/latch input of said parallel to serial shift register and having a reset input operatively connected to said reset input of said system, said second frequency divider dividing the frequency of a signal input thereto by a factor of two.

6. A binary data encoding system for converting an original two bit data sequence to a converted four bit code comprising:

a means for converting a serial data input containing said original data sequence to a parallel form;

a converter means operatively connected to said serial to parallel means for converting a parallel output of said serial to parallel converter means to a different parallel form;

and a parallel to serial converter means operatively connected to said converter means for converting a parallel output of said converter means to a serial output containing said converted code;

wherein said original data sequence is converted to a converted code in accordance with the following:

| Original Data | Converted Code | Conditions |
| --- | --- | --- |
| 11 | Y000 | |
| 01 | 0010 | |
| 10 | 0100 | "$E_2E_1$" ≠ "10" and "$L_1L_2$" = "00" |
| 10 | 0001 | "$E_2E_1$" = "10" and "$L_1L_2$" = "00" |
| 10 | 0000 | "$E_2E_1$" = "10", "$L_1L_2$" = "10" and "$L_3L_4$" = "00" |
| 10 | 0100 | "$E_2E_1$" ≠ "10", "$L_1L_2$" = "10" and "$L_3L_4$" = "00" |
| 10 | Y001 | Except the Foregoing |
| 00 | 0000 | "$E_4E_3$" ≠ "10", "$E_2E_1$" = "10" and "$L_1L_2$" ≠ "01" |
| 00 | 0001 | "$E_4E_3$" ≠ "10", "$E_2E_1$" = "10" and "$L_1L_2$" = "01" |
| 00 | 0000 | "$E_2E_1$" = "10" |
| 00 | 0100 | Except the Foregoing | where $E_n$: data bits preceding by n-bits, 2-bit data to be converted in original data sequence $L_n$: data bits secceeding by n-bits, 2-bit data to be converted in original data sequence and Y: complement logic of logical sum of two bits immediately before code bit Y in converted code sequence supplimentation;

a parallel to serial shift register having two inputs which are designated G-H and which are respectively operatively connected to said outputs $D_1$ and $D_0$ of said read only memory and having an output comprising an output of said binary data encoding system and having a shift clock input operatively connected to an output of a first frequency divide;

said first frequency divided have its input connected to said clock input and having its output comprising another output of said binary data encoding system and being connected to an input of a second frequency divider and having a reset input connected to said reset input, said first frequency divider dividing the frequency of said digital clock signal by a factor of two;

said second frequency divider having an output connected to a shift/latch input of said parallel to serial shift register and having a reset input operatively connected to said reset input of said system, said second frequency divider dividing the frequency of a signal input thereto by a factor of two.

7. A binary data encoding system for converting an original two bit data sequence to a converted four bit code comprising:

a means for converting a serial data input containing said original data sequence to a parallel form;

a converter means operatively connected to said serial to parallel means for converting a parallel output of said serial to parallel converter means to a different parallel form;

and a parallel to serial converter means operatively connected to said converter means for converting a parallel output of said converter means to a serial output containing said converted code;

wherein said original data sequence is converted to a converted code in accordance with the following:

| Original Data | Converted Code | Conditions |
| --- | --- | --- |
| 11 | Y000 | |
| 01 | 0000 | "$E_6E_5$" ≠ "10", "$E_4E_3$" = "10" and "$E_2E_1$" = "00" |
| 01 | 0010 | Except the Foregoing |
| 10 | 0100 | "$E_2E_1$" ≠ "10" and "$L_1L_2$" = "00" |
| 10 | 0001 | "$E_2E_1$" = "10" and "$L_1L_2$" = "00" |
| 10 | 0000 | "$E_2E_1$" = "10", "$L_1L_2$" = "10" and "$L_3L_4$" = "00" |
| 10 | 0100 | "$E_2E_1$" ≠ "10", "$L_1L_2$" = "10" and "$L_3L_4$" = "00" |
| 10 | Y001 | Except the Foregoing |
| 00 | 0000 | "$E_4E_3$" ≠ "10", "$E_2E_1$" = "10" and "$L_1L_2$" ≠ "01" |
| 00 | 0001 | "$E_4E_3$" ≠ "10", "$E_2E_1$" = "10" and "$L_1L_2$" = "01" |
| 00 | 0010 | "$E_4E_3$" = "10" and "$E_2E_1$" = 10 |
| 00 | 0100 | Except the Foregoing | where $E_n$: data bits preceding by n-bits, 2-bit data to be converted in original data sequence $L_n$: data bits secceeding by n-bits, 2-bit data to be converted in original data sequence and Y: complement logic of logical sum of two bits immediately before code bit Y in converted code sequence supplimentation;

a parallel to serial shift register having two inputs which are designated G-H and which are respectively operatively connected to said outputs $D_1$ and $D_0$ of said read only memory and having an output comprising an output of said binary data encoding system and having a shift clock input operatively connected to an output of a first frequency divide;

said first frequency divided have its input connected to said clock input and having its output comprising another output of said binary data encoding system and being connected to an input of a second frequency divider and having a reset input connected to said reset input, said first frequency divider dividing the frequency of said digital clock signal by a factor of two;

said second frequency divider having an output connected to a shift/latch input of said parallel to serial shift register and having a reset input operatively connected to said reset input of said system, said second frequency divider dividing the frequency of a signal input thereto by a factor of two.

* * * * *

UNITED STATES PATENT AND TRADEMARK OFFICE
CERTIFICATE OF CORRECTION

PATENT NO. : 4,496,934
DATED : January 29, 1985
INVENTOR(S) : Teruo Furukawa

It is certified that error appears in the above-identified patent and that said Letters Patent is hereby corrected as shown below:

Column 4, 3rd Table, line 8 (from bottom), change " "0" " to --"00"--.

line 6 (from bottom), change " "0" to --"00"--.

Column 7, 7th Table, penultimate line, before " "$E_2E_1$" " insert --"$E_4E_3$" = "10" and--.

Column 9, line 6 (after 9th Table), change "(10000010011000010)" to --(1000001001000010)--.

Column 12, table in claim 1, delete "1" under $A_7$.

Column 17, penultimate line in table, before " "$E_2E_1$" " insert --"$E_4E_3$" = "10" and--.

Signed and Sealed this

Twenty-eighth Day of October, 1986

[SEAL]

Attest:

DONALD J. QUIGG

Attesting Officer

Commissioner of Patents and Trademarks